Dec. 26, 1933.    G. B. WARNER    1,940,984
FRONT SHUTTER FOR AUTOMOBILE RADIATORS
Filed April 5, 1930
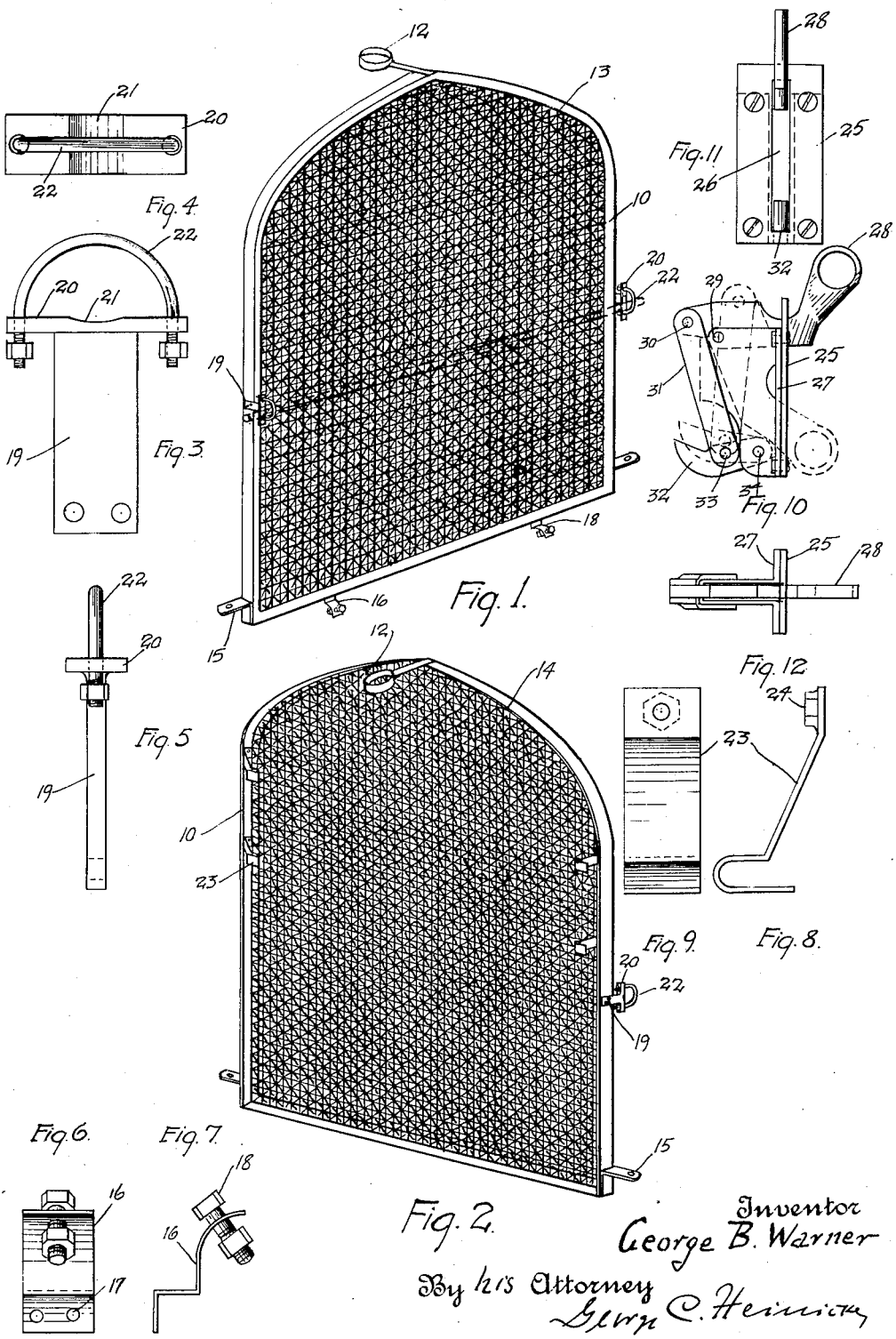

Patented Dec. 26, 1933

1,940,984

UNITED STATES PATENT OFFICE 1,940,984

FRONT SHUTTER FOR AUTOMOBILE RADIATORS

George B. Warner, New York, N. Y., assignor to Yankee Metal Products Corp., a corporation of New York Application April 5, 1930. Serial No. 441,967

7 Claims. (Cl. 293—54)

This invention relates to improvements in radiator front plates, shields or shutters and it is the principal object of my invention to provide such a shield which is exceedingly strong and durable while presenting a highly ornamental appearance, and a shield plate which can be readily and conveniently attached to and removed from an automobile radiator.

Another object of my invention is the provision of a radiator shield the mesh or net work of which is composed of either diagonally intersecting square section crimped wire or half round lattice mesh or squarely intersecting wires of round-cross-section arranged in close proximity, either singly used or in combination.

Still another object of my invention is the provision of a radiator shield equipped with a plurality of simple, yet efficient and appropriate fastening means permitting a ready securing of the shield to a radiator or removal therefrom, avoiding all rattling.

A further object of my invention is the provision of a suitable lifting tool for lifting the shield from the radiator.

A still further object of my invention is the provision of a radiator shield or front equipped with suitable shackles allowing the securing of the shield to the front cross-bar of the automobile.

These and other objects and advantages of my invention will become more fully known as the description thereof proceeds, and will then be specifically defined in the appended claims.

In the accompanying drawing, forming a material part of this disclosure:

Fig. 1 is a perspective front elevation of a radiator front plate constructed according to my invention.

Fig. 2 is a perspective rear elevation thereof.

Fig. 3 is a front elevation of fastening clamp for the sides of the front plate and frame.

Fig. 4 is an end view thereof.

Fig. 5 is a side edge view of the clamp.

Fig. 6 is a front elevation of a clamp for the lower end of the front plate.

Fig. 7 is a side edge elevation thereof.

Figs. 8 and 9 are front and side edge elevations respectively of another clamp used for clamping the front plate to the radiator.

Fig. 10 is a side elevation of a device for lifting the radiator front plate from the radiator.

Fig. 11 is a front elevation thereof.

Fig. 12 is an end view thereof.

As illustrated, the front or shield plate for an automobile radiator consists substantially of a frame 10 of a form suitable to fit the radiator front and equipment with an upper band 12 attached to the frame 10 and adapted to engage over the filler nipple of the automobile radiator.

The front of the radiator shield plate is composed of a net-work or mesh composed of diagonally intersecting flat metal strips of preferably square section, crimped wire designated 13, or a network or mesh of squares formed by intersecting wires half round lattice mesh or of round cross-section either used alone or in combination with each other, and designated 14. The frame of the shield can have any suitable form for instance shown the form in Figures 1 and 2 as an example.

The frame 10 is equipped at its lower side edges with brackets 15 for attaching it to the chassis of a car, while curved clamps 16 attached to the lower bar of frame 10 by suitable fastening means passing through openings 17 are adapted to engage the front part of a car and to be clamped thereto by means of suitable bolts 18.

To the side edges of frame 10 are attached the plates 19 projecting beyond the front face of the shield plate and each carrying a cross-bar 20 having a median depression 21 for engagement by the front cross-bar of the automobile.

The ends of each cross-bar are equipped with threaded openings for the reception and passage of the threaded ends of a shackle 22 through which the front cross-bar of the automobile passes.

To the inner faces of the side bars of frame 10 are loosely attached hooks 23 gripping behind the radiator frame by means of screws passing through the end sockets 24 held in place by suitable nuts. In Figures 10, 11 and 12, I have shown a suitable tool for lifting the radiator shutter to allow its ready disengagement and removal from the radiator.

This tool comprises substantially a body or front plate 25 having a longitudinal slot 26 formed therein, and a bracket 27 attached to the rear thereof. A handle 28 passes through slot 26 and in rear of plate 25 is pivotally attached to the bracket 27 as at 29.

To the inner end of handle 28 are pivoted as at 30, the upper ends of a pair of spaced parallel links 31 between the lower ends of which a pawl 32 is pivoted intermediate its ends, as at 33, which is pivotally attached at its inner end, as at 34 to the bracket 27.

The operation of my device will be clearly understood from the above description and by simultaneous inspection of the drawing, and it will be evident that the front shield plate in its frame 10 will present an ornamental appearance and on account of the double mesh will be highly resistant, strong and durable.

The brackets 15 will securely support the frame on the chassis, while the loose hooks 23 will readily snap into engagement with the inner edges of the radiator front, and the clamps 16 allow an engagement of the lower front part of the automobile by the bolts 18.

The shackles 22 will allow a securing of the middle part of the shield to the front cross-bar of the car, while the tool will assist in lifting the front shield frame from the radiator.

It will be understood that I have described and shown the preferred form of my shutter only as one example of the many possible ways to practically construct the same and that I may make such changes in its general arrangement and in the construction of the minor details of my invention as come within the scope of the appended claims without departure from the spirit of my invention and the principles involved.

Having thus described my invention what I claim as new and desire to secure by Letters Patent is:

1. A front shield for the radiators of automobiles comprising a frame, a network of diagonally intersecting square section crimped wire, and round squarely intersecting wires, and loose inner clamps to snap into engagement with the radiator frame, means for attaching the frame to the lower front part of the automobile, means for setting the shield onto the front part of the car and holding it there, means for engaging the filler nipple of the car, and means for engaging the front cross-bar of an automobile and allowing its passage.

2. A front shield for the radiators of automobiles comprising a frame, a network of half round lattice mesh, a pair of lower side brackets for removably holding the shield to the car, a plurality of hook-shaped members loosely connected to the side bars of the frame, means for holding the top of the frame on the filler nipple of the radiator, and a means for holding the shield to the front cross-bar of the car, allowing its passage.

3. A front shield for the radiators of automobiles comprising a frame, a network of diagonally intersecting and squarely intersecting elements, brackets for securing the lower ends of the shield to the car, clamps attached to the lower end bar of the frame, and bolts passed through said clamps for engaging and securely holding the said end bar to the car, a means for engaging the filler nipple of the radiator, and shackles for holding the shield to the front cross-bar of the car.

4. A means for removably attaching the front shield plate of automobile radiators including its frame, said means comprising a means for attaching said frame to the chassis of the automobile, clamps attached to said frame, and the front part of the automobile, plates attached to the sides of the frame and projecting beyond the front face of the shield, a cross-bar carried by each of said plates and having a median depression, and means loosely attached to the frame adapted to grip behind the radiator frame.

5. A means for removably attaching the front shield plate of radiators to the same, including its frame, said means comprising perforated brackets on the lower side faces of said frame adapted to attach said frame to the chassis of the automobile by means passed through the perforations in said brackets, perforated curved clamps attached to the lower band of said frame, means passing through the perforations of said clamps engaging the front part of the automobile and means including shackles to allow the passage of the front cross-bar of the automobile to hold said shield against the radiator, and hooks loosely attached to the inner faces of the side bars of the frame adapted to grip behind the radiator frame.

6. A shield for automobile radiators, comprising a frame, holding means secured to said frame and comprising forwardly projecting arms, means upon said arms to engage an automobile fender brace bar, a grille extending over the central portion of and secured to said frame.

7. A shield for automobile radiators, comprising a frame, holding means secured to said frame, said holding means comprising hooks adapted for passage through the radiator to engage the rear surface of the shell thereof, and forwardly projecting arms and means thereon to engage the automobile fender brace bar, and a grille extending over the central portion of and secured to said frame.

GEORGE B. WARNER.